(No Model.)
A. PORTER.
CAR WHEEL AND AXLE.
No. 544,468. Patented Aug. 13, 1895.
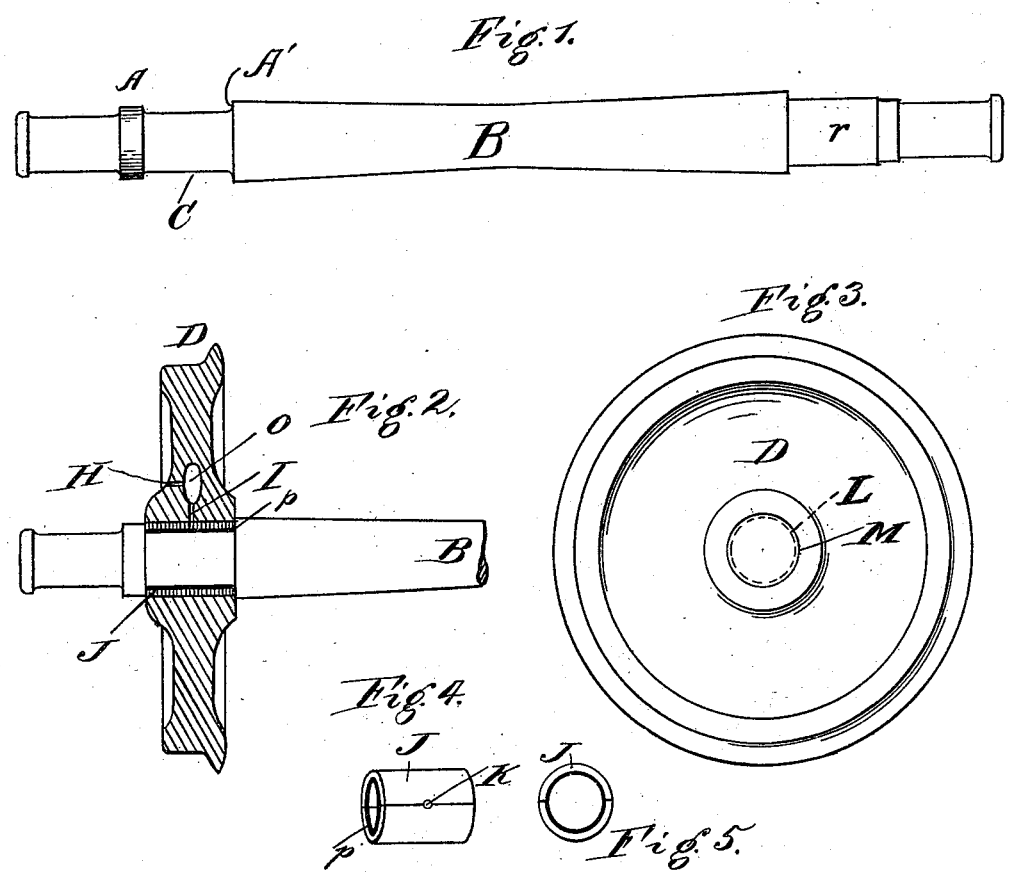
Witnesses:
Charles E. Burnap
Reuben Anderson
Inventor:
Albert Porter
By Dyrenforth & Dyrenforth
Att'y

UNITED STATES PATENT OFFICE.

ALBERT PORTER, OF CHICAGO, ILLINOIS.

CAR WHEEL AND AXLE.

SPECIFICATION forming part of Letters Patent No. 544,468, dated August 13, 1895.

Application filed March 28, 1895. Serial No. 543,498. (No model.)

*To all whom it may concern:*

Be it known that I, ALBERT PORTER, a citizen of the United States, residing at Chicago, in the county of Cook and State of Illinois, have invented a new and useful Improvement in Car Wheels and Axles, of which the following is a specification.

My invention relates to an improvement in the well-known car-wheel-and-axle construction by which the wheel at one end of an axle is tight thereon to turn with it and the wheel at the other end of the axle is loose to turn independently thereof for the purpose of avoiding undue strain in rounding curves.

The object of my invention is to provide an improved construction of loose-wheel connection which shall be entirely boltless, simple, and durable, and whereby the axle shall not be weakened, nor the weight of the loose-wheel end of the axle be materially, if at all, greater than that of the tight-wheel end.

Referring to the accompanying drawings, Figure 1 is a plan view of the axle constructed in accordance with my improvement. Fig. 2 shows the loose-wheel construction in vertical section on its end of the axle. Fig. 3 is an outer face view of the loose wheel; Fig. 4, a perspective view of the sectional-box detail, and Fig. 5 an end view of the same detail.

B is the axle provided at one end with the usual seat $r$ for the tight wheel. (Not shown.) I prefer that the axle shall be forged in a single piece to form the different parts. Near its opposite end the axle has formed upon it the seat C for the loose wheel D, but very slightly less in diameter than the seat $r$, and extending between a shoulder A', toward which to produce it the axle is enlarged in diameter "or built up" from its transverse center, and a circumferential flange A for confining, endwise a cylindrical box J. The diameter of the flange A should be slightly less than that of the shoulder A'. The box J is formed of metal, by preference sheet-steel, in preferably two longitudinal or semicylindrical sections, each having a semicircular recess at the longitudinal center of one edge, whereby when the two edges of the sections meet an oil-duct K is formed. The internal diameter of the box J, each section of which should be lined with Babbitt metal, as indicated at $p$, causes it to fit snugly about the seat C, to which it is applied by placing the sections thereon when the edges meet, and the length of the sections is such as to cause the box and the seat C to correspond in length, with which, moreover, that of the loose-wheel hub also corresponds, at least approximately, to completely or practically cover the sectional box J. The thickness of the metal of the box-sections is such as to render the outer diameter of the box slightly greater than that of the flange A. Thus the diameter of the seat C with the box J applied to it is somewhat greater than that of the seat $r$ for the tight wheel. Accordingly the central opening M in the loose wheel D requires to be wider than the tight-wheel opening, the diameter of which is indicated at L in Fig. 3; but the opening M, which can thus readily pass over the flange A in adjusting the loose wheel in place, is narrower than the diameter of the shoulder A'. I show in the wheel D a chamber O for lubricating material, to which, from the outer side of the wheel, leads a duct H, and from which to the opening M leads a duct I.

To adjust the loose wheel D in place, the sections of the cylindrical box J are first applied to the seat C, when the wheel, the opening M in which is slightly narrower than the diameter of the box, is forced upon the latter by subjecting it to great pressure, preferably hydraulic, until the inner side of the wheel abuts about its opening M against the shoulder A'. Thus by means of a construction involving the fewest possible separable parts—namely, the wheel, the axle, and the sectional box—the loose wheel is safely secured upon the axle in a desirable manner, the pressure employed in forcing the wheel upon the box in place firmly tightening or compressing its sections together at their abutting edges, but without causing them to unduly hug the seat C. Moreover, my improved construction does not render the weight of the loose-wheel end of the axle excessive over that of its tight-wheel end, since the weight of the box J is compensated for by the loss of metal from the wheel D due to the enlarging of the opening M, and from the seat C, due to the lesser diameter thereof compared with the seat $r$.

What I claim as new, and desire to secure by Letters Patent, is—

In combination, the axle B provided near one end with a seat $r$ for the tight-wheel and having formed upon it, near its opposite end, the shoulder A', toward which the axle is enlarged in diameter from near its transverse center, and the flange A, affording between them the seat C slightly less in diameter than the seat $r$, a box J on said seat, of lesser diameter than the shoulder and of greater external diameter than the flange, and formed in cylinder-sections abutting at their edges and confined endwise between said shoulder and flange, and a wheel D, having its hub corresponding in length substantially with that of said box and provided with an opening M of greater diameter than said flange and of lesser diameter than that of the shoulder and than the external diameter of the box, and surrounding and practically covering completely said box and tightened thereon to rotate with it independently of the axle, the tight and loose wheel ends of said axle approximately corresponding in weight, subtially as described.

ALBERT PORTER.

In presence of—
M. J. FROST,
J. H. LEE.